United States Patent
Slusarz et al.

(10) Patent No.: US 12,158,084 B2
(45) Date of Patent: Dec. 3, 2024

(54) WALL PROVIDED WITH A COOLING HOLE HAVING A DIFFUSION PORTION WITH A TRIANGULAR SECTION

(71) Applicant: SAFRAN AIRCRAFT ENGINES, Paris (FR)

(72) Inventors: Michel Slusarz, Moissy-Cramayel (FR); Kevin Michael Mugnier, Moissy-cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 18/264,847

(22) PCT Filed: Feb. 3, 2022

(86) PCT No.: PCT/FR2022/050206
§ 371 (c)(1),
(2) Date: Aug. 9, 2023

(87) PCT Pub. No.: WO2022/171950
PCT Pub. Date: Aug. 18, 2022

(65) Prior Publication Data
US 2024/0125238 A1  Apr. 18, 2024

(30) Foreign Application Priority Data
Feb. 10, 2021 (FR) ........................ 2101246

(51) Int. Cl.
F23R 3/00 (2006.01)
F01D 5/18 (2006.01)
F01D 25/12 (2006.01)

(52) U.S. Cl.
CPC .............. *F01D 5/186* (2013.01); *F01D 25/12* (2013.01); *F23R 3/002* (2013.01); *F05D 2260/202* (2013.01)

(58) Field of Classification Search
CPC .......... F01D 5/186; F01D 25/12; F23R 3/002; F05D 2260/202
See application file for complete search history.

(56) References Cited

U.S. PATENT DOCUMENTS

| | | | |
|---|---|---|---|
| 7,328,580 B2 * | 2/2008 | Lee | B23K 26/384 415/115 |
| 11,898,465 B2 * | 2/2024 | Craig | F01D 5/284 |
| 2013/0205787 A1 | 8/2013 | Zelesky et al. | |
| 2013/0206733 A1 | 8/2013 | Levasseur et al. | |
| 2013/0209236 A1 | 8/2013 | Xu | |
| 2018/0315520 A1 * | 11/2018 | Izcara Zurro | H01B 3/56 |
| 2020/0190990 A1 * | 6/2020 | Hohenstein | F23R 3/06 |

OTHER PUBLICATIONS

International Search Report for issued in Application No. PCT/FR2022/050206 dated May 19, 2022.
Written Opinion for PCT/FR2022/050206 dated May 19, 2022.

* cited by examiner

*Primary Examiner* — Todd E Manahan
*Assistant Examiner* — Rodolphe Andre Chabreyrie
(74) *Attorney, Agent, or Firm* — Pearne & Gordon LLP

(57) ABSTRACT

A turbomachine component such as a blade, includes a wall provided with at least one cooling hole having a metering portion and a tapered diffusion portion. The diffusion portion includes a central edge forming a bottom of the diffusion portion that is oblique with respect to a flow axis of the cooling hole.

9 Claims, 5 Drawing Sheets

WALL PROVIDED WITH A COOLING HOLE HAVING A DIFFUSION PORTION WITH A TRIANGULAR SECTION

This is the National Stage of PCT international application PCT/FR2022/050206, filed on Feb. 3, 2022 entitled "WALL PROVIDED WITH A COOLING ORIFICE HAVING A TRIANGULAR-SECTION DIFFUSION PORTION", which claims the priority of French Patent Application No. 2101246 filed Feb. 10, 2021, both of which are incorporated herein by reference in their entireties.

TECHNICAL FIELD

The invention relates to the field of aircraft turbomachines and the field of air film cooling of parts such as turbine blades.

PRIOR ART

A conventional turbomachine turbine comprises at least one nozzle and at least one impeller each comprising blades exposed to hot combustion gases.

In order to preserve the mechanical integrity of the blades, it is known to introduce cool air into them and to provide them with cooling holes designed to direct part of this cool air onto their external surface so as to form a thermal protection film.

A conventional blade cooling hole comprises a metering portion, also referred to as a "calibrating portion", which is usually cylindrical and allows the amount of air passing through this hole to be adjusted, and a tapered diffusion portion that improves the distribution of the cooling air over the external surface of the blade.

The flow of cool air exiting a conventional cooling hole is exposed to counter-rotating vortices that form at the outlet section of this hole, which causes the flow of cool air to separate and hot gases to be ingested into the cooling hole. This results in a reduction in cooling efficiency.

DISCLOSURE OF THE INVENTION

One object of the invention is to provide a cooling hole geometry that increases cooling efficiency.

To this end, an object of the invention is a turbomachine component according to the features of claim 1.

Thus, in sections formed by a plane normal to the flow axis and intersecting the central edge, the point of the central edge passing through this plane is the point furthest away from the flow axis of all the points of the third surface contained in this section.

The central edge thus enables a fraction of the cooling fluid to be gradually moved away from the flow axis and from the main zones of influence of the counter-rotating vortices that form at the outlet section of the cooling hole.

On both sides of the central edge, the tapered surface extends so as to form surface parts called flow guiding portions.

Such guiding portions enable a fraction of the cooling fluid to be guided towards the outlet through the bottom of the diffusion portion.

Given the orientation of the central edge and the fact that it forms a bottom of the diffusion portion, the guiding portions reduce the risk of ingesting hot gases, in particular at the downstream end of the bottom of the diffusion portion, by gradually moving the counter-rotating vortices away from the bottom of the diffusion portion.

The invention thus improves cooling efficiency. In addition, in a simple and effective manner, the invention proposes a "shaped" cooling hole architecture, which makes it possible to come very close to the function conferred by a shaped cooling hole of the single-lobe type, namely to channel a flow of cold air to the centre which is protected from counter-rotating vortices at the edge of the hole. The absence of a lobe makes it easier to manufacture the whole.

According to a first embodiment, the guiding portions are flat.

According to this first embodiment, the diffusion portion has, in a plane orthogonal to the flow axis, a section having a part forming a "V", defining a triangular-shaped half-section with a vertex formed by the central edge.

According to a second embodiment, the guiding portions are curved, having, for example, a convex or concave shape.

According to this second embodiment, the diffusion portion can have, in a plane orthogonal to the flow axis, a section having a part forming a deformed "V", defining a quasi-triangular half-section with a vertex formed by the central edge.

When the third surface comprises lateral edges as defined above, these are preferably inclined with respect to the central edge.

The lateral edges can furthermore be oriented with respect to the flow axis such that each of them moves away from the flow axis in a direction going from the first surface towards the second surface.

The central edge preferably has a greater length than that of each of the lateral edges.

This accentuates the phenomenon of counter-rotating vortices moving gradually away from the bottom of the diffusion portion and the corresponding movement of the fluid channelled by the bottom of the diffusion portion away from the zone of influence of such vortices.

Lateral edges that are shorter than the central edge also reduce the lateral ingestion of hot gases in the diffusion portion.

In one embodiment, the lateral edges intersect the central edge in an inlet section of the diffusion portion.

In another embodiment, the lateral edges do not intersect the central edge.

The diffusion portion preferably has no lobe.

In one embodiment, the tapered surface is symmetrical with respect to a plane passing through the central edge.

This plane can be a plane of symmetry for the diffusion portion in its entirety and/or for the tapered surface and/or for the lateral edges.

One object of the invention is also a turbine for a turbomachine, comprising an impeller, a nozzle and at least one component as defined above forming a blade of the impeller or nozzle.

One object of the invention is also a combustion chamber for a turbomachine, comprising at least one component as defined above forming a wall of the combustion chamber.

One object of the invention is also a turbomachine for an aircraft such as an aeroplane or a helicopter, comprising such a turbine and/or such a combustion chamber.

According to another aspect, one object of the invention is a method for manufacturing a component as defined above.

In one embodiment, the method comprises a step of electrical discharge machining of the diffusion portion.

In one embodiment, the method comprises a step of laser treatment of the diffusion portion, in particular of the tapered surface.

Other advantages and features of the invention will become apparent upon reading the detailed, non-limiting description that follows.

BRIEF DESCRIPTION OF THE DRAWINGS

The following detailed description refers to the accompanying drawings in which.

DETAILED DESCRIPTION OF EMBODIMENTS

Figure 1:
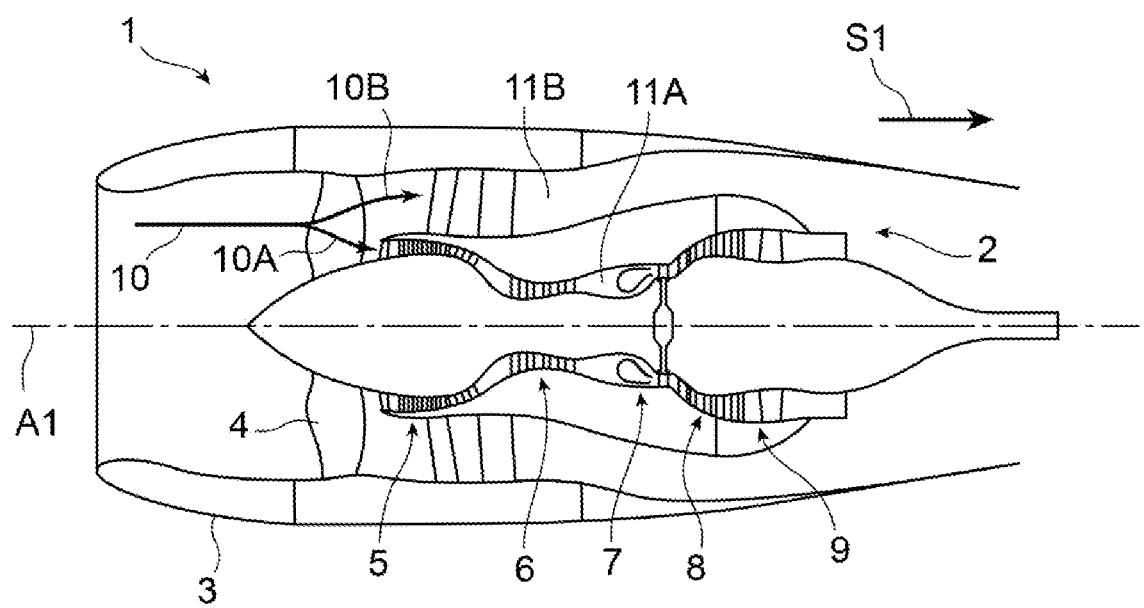
FIG. 1 is a schematic longitudinal sectional view of an aircraft propulsion unit.

FIG. 1 shows an aircraft propulsion unit 1 (not shown) comprising a turbomachine 2 and a nacelle 3 extending around a central longitudinal axis A1.

Subsequently, the terms "upstream" and "downstream" are defined with respect to a direction S1 of gas flow through the propulsion unit 1 along the axis A1.

In the example of FIG. 1, the turbomachine 2 is a turbofan engine comprising, from upstream to downstream, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

During operation of the turbofan engine 2, an air flow 10 enters the propulsion unit 1 via an air inlet of the nacelle 3, passes through the fan 4 and then splits into a central primary flow 10A and a secondary flow 10B. The primary flow 10A flows into a primary gas circulation duct 11A within the gas generator. In turn, the secondary flow 10B flows into a secondary duct 11B surrounding the gas generator and radially outwardly delimited by the nacelle 3.

In a manner known per se, the turbines 8 and 9 each comprise at least one nozzle and at least one impeller each comprising blades, shown in FIG. 1, which extend into the primary duct 11A.

Figure 2:
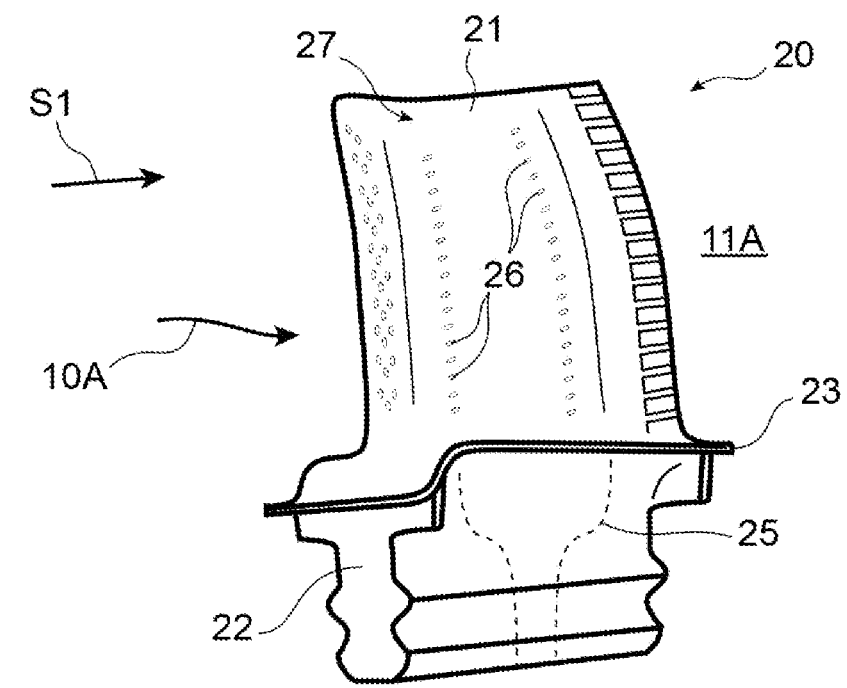
FIG. 2 is a schematic perspective view of an impeller blade of a turbine of the propulsion unit of FIG. 1.

FIG. 2 shows a blade 20 for an impeller fitted to the high-pressure turbine 8 in this example.

The blade 20 has a conventional general structure, including a vane 21, a foot 22 intended to cooperate with a disc housing (not shown) of the impeller and a platform 23 intended to delimit the primary duct 11A radially inwards.

In operation, the vane 21 extends into the primary duct 11A and is therefore exposed to the hot gases coming from the combustion chamber 7 (see FIG. 1).

The turbofan engine 2 comprises a cooling circuit that enables cool air to be conveyed into an internal cavity 25 of the blade 20.

The blade 20 comprises cooling holes 26 connecting an internal surface (not shown in FIG. 2) of the vane 21 to an external surface 27 of the vane 21, the internal surface delimiting the internal cavity 25, the external surface 27 being exposed to the primary flow 10A.

The cooling holes 26 allow some of the cool air circulating in the internal cavity 25 of the blade 20 to be evacuated so as to form a film of cool air on the external surface 27 that protects the vane 21 from the hot combustion gases 10A.

The invention relates to the geometry of such cooling holes 26.

Figure 3:
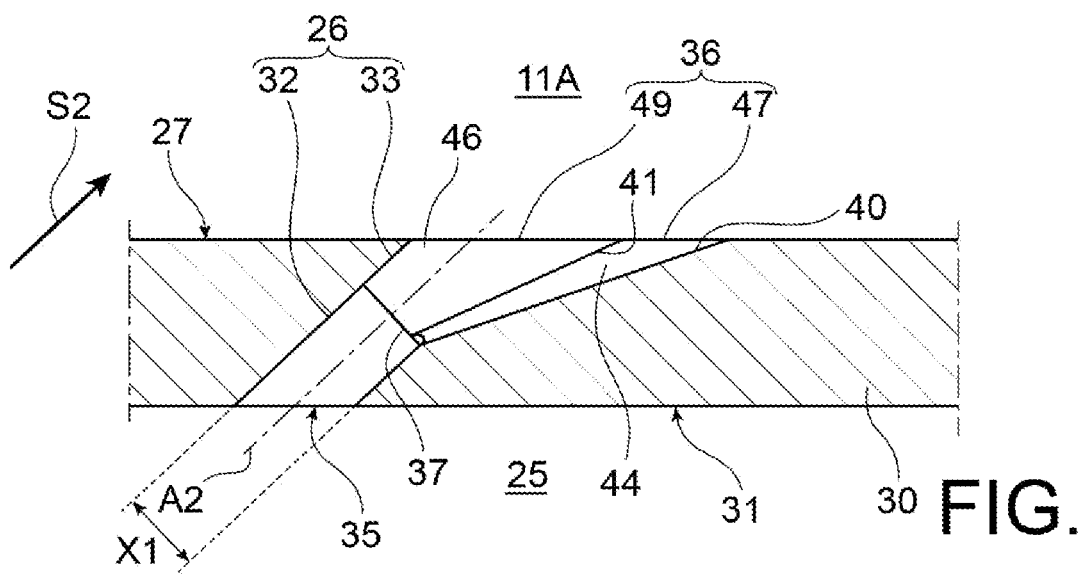
FIG. 3 is a schematic view in cross-section of a wall comprising a cooling hole according to a first embodiment of the invention.

FIG. 3 shows part of a wall 30 comprising a cooling hole 26 according to the invention.

The cooling hole 26 has a flow axis A2.

The wall 30 comprises a first surface 31 delimiting a first space 25 and a second surface 27, opposite the first surface 31, delimiting a second space 11A.

The distance between the first surface 31 and the second surface 27 defines a thickness of the wall 30.

The cooling hole 26 is designed to convey a cooling fluid circulating in the first space 25 to the second space 11A through the wall 30, i.e. from the first surface 31 to the second surface 27, so as to form a film of cooling fluid on the second surface 27.

In this example, the wall 30 of FIG. 3 forms the vane 21 of the blade 20 of FIG. 2 such that said first surface 31 forms the internal surface of the vane 21, said second surface forms the external surface 27 of the vane 21, said first space corresponds to the internal cavity 25 of the blade 20 and said second space corresponds to the primary duct 11A of the turbofan engine 2.

In a non-limiting manner, in embodiments not described in detail, the wall 30 of FIG. 3 can form an impeller blade and/or a nozzle blade for the high-pressure turbine 8 and/or the low-pressure turbine 9 and/or a wall of the combustion chamber 7. The present description applies by analogy to these embodiments.

Of course, the wall 30 can comprise a plurality of cooling holes 26 as described hereinafter with reference to FIG. 3 and following.

With reference to FIG. 3, the cooling hole 26 comprises a metering portion 32, or calibrating portion, which opens onto the first surface 31 so as to form an inlet 35 of the cooling hole 26, and a diffusion portion 33, which opens onto the second surface 27 so as to form an outlet 36 of the cooling hole 26.

In this example, the metering portion 32 has a cylindrical section with diameter X1 and has a central axis forming said flow axis A2.

The flow axis is oblique with respect to the first surface 31 and the second surface 27.

The metering portion 32 allows the amount of cooling air entering the cooling hole 26 via the inlet 35 from the first space 25 to be metered or calibrated.

The diffusion portion 33 extends the metering portion 32 such that the flow of air entering the cooling hole 26 via the inlet 35 can exit it via the outlet 36.

With reference to a direction of flow S2 of the flow of cooling air thus flowing through the cooling hole 26, the downstream end 37 of the metering portion 32, i.e. the outlet of the metering portion 32, constitutes the upstream end of the diffusion portion 33, i.e. the inlet of the diffusion portion 33.

The diffusion portion 33 is tapered such that the outlet section 36 has a greater area than the area of the upstream end 37 of the diffusion portion 33 and consequently greater than the area of the inlet section 35.

The diffusion portion 33 is formed by removing material from the wall 30 such that it forms a third surface that delimits the diffusion portion 33.

In the embodiment of FIGS. 3 to 6, the third surface comprises a central edge 40 and two lateral edges 41 and 42.

In this example, the edges 40, 41 and 42 are straight, i.e. rectilinear along their entire length.

The central edge 40 extends along the flow axis A2 and is inclined, at an angle, to the flow axis A2 (see FIG. 3).

More precisely, the central edge 40 is oriented with respect to the flow axis A2 so as to move away from it in the direction of flow S2.

The lateral edges 41 and 42 also extend along the flow axis A2 each being at an angle to the flow axis A2 so as to move away from it in the direction of flow S2 (see FIG. 3).

Figure 4:
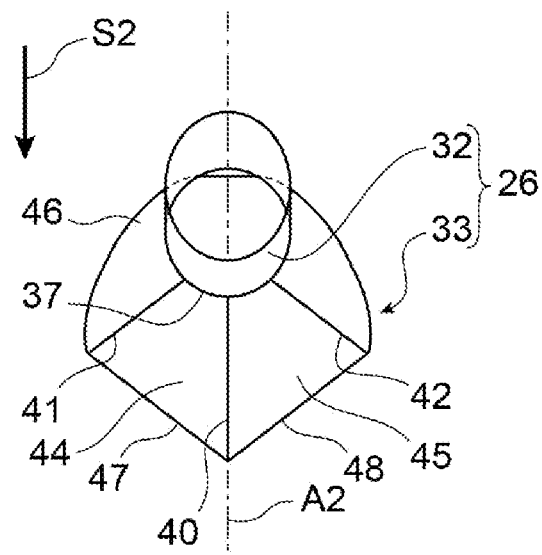
FIG. 4 is a schematic perspective view of a surface delimiting a cooling hole according to the first embodiment of the invention.

The third surface is segmented into three surface parts 44, 45 and 46 in this example (see FIG. 4).

The surface part 44 is delimited by the central edge 40 and by the lateral edge 41, the surface part 45 is delimited by the central edge 40 and by the lateral edge 42, whilst the surface part 46 is delimited by the lateral edges 41 and 42.

The surface parts 44 and 45 form a tapered surface of the diffusion portion 33.

In this embodiment, the surface parts 44 and 45 are flat and the surface part 46 is curved.

In this example, the surface parts 44 to 46 are smooth, i.e. without gaps.

With reference to FIGS. 3 and 4, the outlet section 36 of the cooling hole 26 is formed by two rectilinear edges 47 and 48 and by a curved line 49.

The edges 47 and 48 are formed by a side of the surface parts 44 and 45, respectively, whilst the line 49 is formed by a side of the surface part 46.

The edges 47 and 48 as well as the line 49 of the outlet section thus delimit the third surface and the second surface 27 from each other.

Thus, in this embodiment, the surface part 44 is delimited by the central edge 40, the lateral edge 41, the outlet section edge 47 and by a first section of the inlet 37 of the diffusion portion 33. The surface part 45 is delimited by the central edge 40, the lateral edge 42, the outlet section edge 48 and by a second section of the inlet 37 of the diffusion portion 33. Finally, the surface part 46 is delimited by the lateral edges 41 and 42, by the line of the outlet section 49 and by a third section of the inlet 37 of the diffusion portion 33.

In this example, the diffusion portion 33 has a transverse plane of symmetry passing through the central edge 40 and through the flow axis A2.

In other words, the diffusion portion 33 comprises two symmetrical half-sections with respect to a transverse plane passing through the central edge 40.

Figure 5:
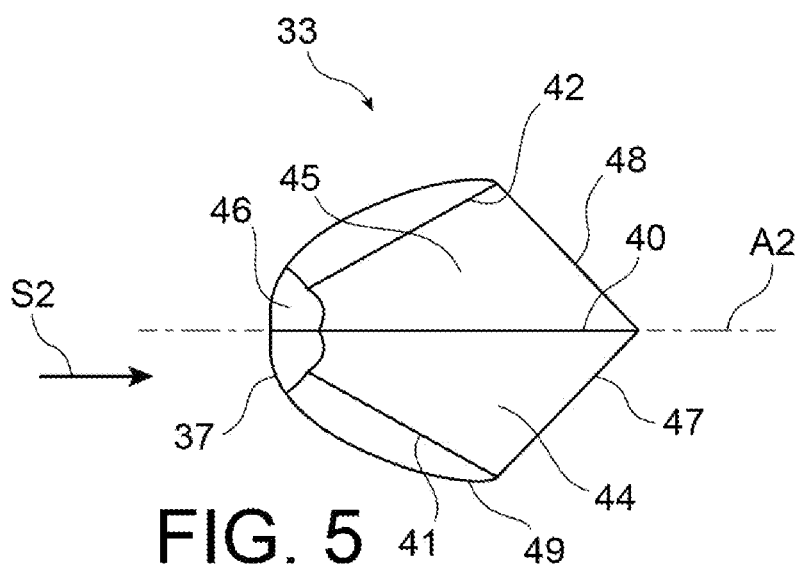
FIG. 5 is a schematic perspective view of a diffusion portion of the cooling hole of FIG. 4.
Figure 6:
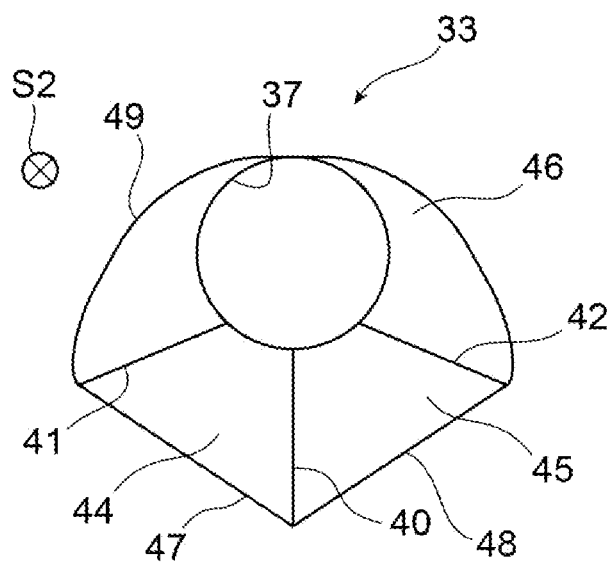
FIG. 6 is a schematic perspective view of the diffusion portion of the cooling hole of FIG. 4.

With reference to FIGS. 3 and 5, the central edge 40 has a greater length than that of each of the lateral edges 41 and 42 and greater than that of any line parallel to the central edge 40 formed by the third surface.

The central edge 40 thus forms a bottom of the diffusion portion 33 such that in each section formed by a plane normal to the flow axis A2 and intersecting the central edge 40, the point of the central edge 40 passing through this plane is the point furthest away from the flow axis A2 of all the points of the third surface contained in this section.

In the example of FIG. 3, the third surface forms a ridge line opposite the central edge 40 with respect to the flow axis A2, which ridge line extends from the inlet 37 of the diffusion portion 33 to the outlet 36 of the cooling hole parallel to the flow axis A2.

More precisely, this ridge line extends at a distance from the flow axis A2 that corresponds to half the diameter X1 of the metering portion 32.

In this example, in each section formed by a plane normal to the flow axis A2 and intersecting the ridge line, the point of this ridge line passing through this plane is the point closest to the flow axis A2 of all the points of the third surface contained in this section.

The cooling hole 26 of the invention enables the formation of counter-rotating vortices to be reduced in the bottom of the diffusion portion 33, in particular on a section downstream of the diffusion portion 33, and thus enables a fraction of the cooling fluid to be channelled outside a zone of influence of such vortices.

The channelling function is in particular carried out by the surface parts 44 and 45, which thus form guiding portions.

In the embodiment of FIGS. 3 to 6, the central edge 40 and the lateral edges 41 and 42 do not meet or intersect. With reference to FIGS. 3 to 6, the edges 40-42 form different points in the inlet section 37 of the diffusion portion 33, which have a respective circumferential coordinate about the flow axis A2.

Figure 7:
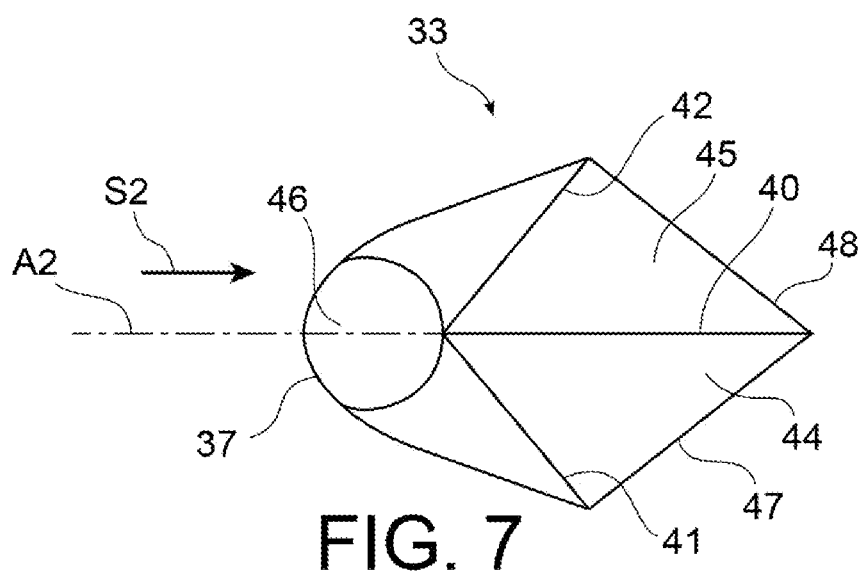
FIG. 7 is a schematic perspective view of a surface delimiting a diffusion portion of a cooling hole according to a second embodiment of the invention.

The embodiment of FIG. 7 differs from that in FIGS. 3 to 6 in that the lateral edges 41 and 42 intersect the central edge 40 in the inlet section 37 of the diffusion portion 33.

In the embodiments described above, the guiding portions 44 and 45 are flat.

Figure 8:
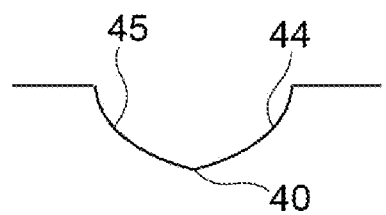
FIG. 8 is a schematic view of concave surface sections forming guiding portions of a cooling hole according to the invention.
Figure 9:
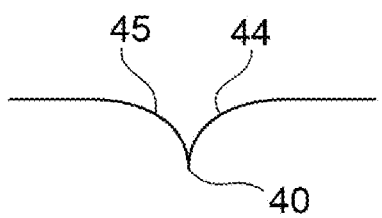
FIG. 9 is a schematic view of convex surface sections forming guiding portions of a cooling hole according to the invention.

Alternatively, the guiding portions 44 and 45 can be curved, for example so as to form concave (FIG. 8) or convex (FIG. 9) surface parts.

In the invention, the diffusion portion 33 has no lobe, making it easier to produce.

The inventors have found that a cooling hole 26 comprising a diffusion portion 33 such as the one illustrated in FIG. 4 provides a gain in cooling efficiency of almost twenty percent compared to a conventional diffusion portion at the same blowing rate.

What is claimed is:

1. A turbomachine component, comprising a wall having a first surface and a second surface opposite the first surface, the wall comprising at least one cooling hole, which has a flow axis and is designed to convey a cooling fluid from the first to the second surface through the wall, the cooling hole comprising a metering portion, which opens onto the first surface, and a diffusion portion without any lobe and which opens onto the second surface, the diffusion portion being delimited by a tapered surface, characterized in that the tapered surface comprises a central edge forming a bottom of the diffusion portion, and in that the tapered surface comprises two lateral edges, which laterally delimit the tapered surface on both sides and each define a flow guiding portion with the central edge, the central edge and the lateral edges being rectilinear over their entire extension from an inlet section of the diffusion portion to an outlet of the cooling hole, wherein the central edge has a greater length than that of each of the lateral edges.

2. The component according to claim 1, wherein the guiding portions are flat.

3. The component according to claim 1, wherein the lateral edges are inclined with respect to the central edge.

4. The component according to claim 1, wherein the lateral edges intersect the central edge in the inlet section of the diffusion portion.

5. The component according to claim 1, wherein the tapered surface is symmetrical with respect to a plane passing through the central edge.

6. A turbine for a turbomachine, comprising an impeller, a nozzle and at least one component according to claim 1 forming a blade of the impeller or nozzle.

7. A combustion chamber for a turbomachine, comprising at least one component according to claim 1 forming a wall of the combustion chamber.

8. A turbomachine for an aircraft being an aeroplane or a helicopter, comprising the turbine according to claim 6.

9. A turbomachine for an aircraft being an aeroplane or a helicopter, comprising the combustion chamber according to claim 7.

\* \* \* \* \*